Patented June 16, 1953

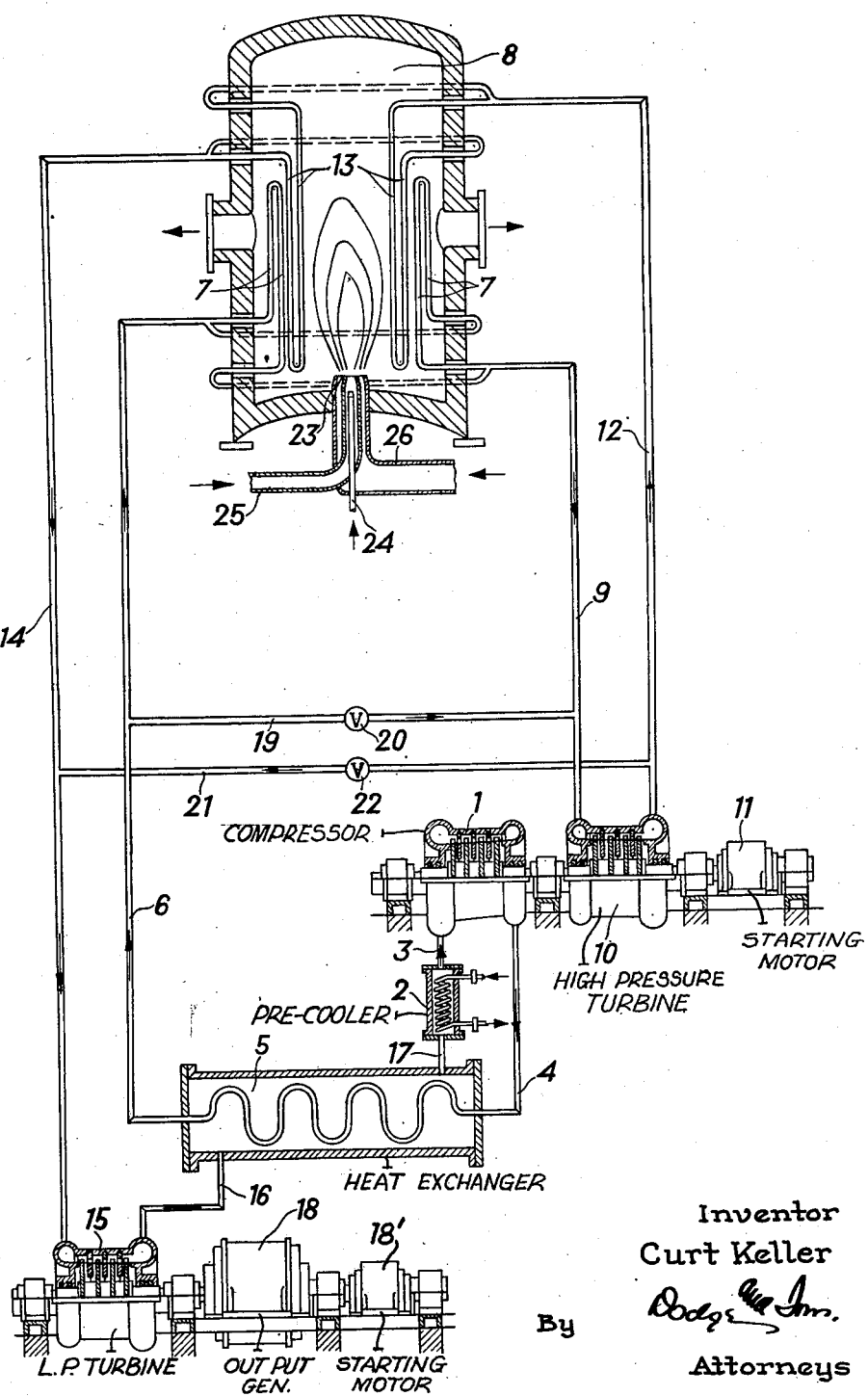

2,641,905

UNITED STATES PATENT OFFICE 2,641,905

CLOSED CIRCUIT POWER PLANT HAVING BYPASS MEANS TO REGULATE HEAT INPUT TO EACH TURBINE

Curt Keller, Kusnacht, Switzerland, assignor to Aktiengesellschaft Fuer Technische Studien, Zurich, Switzerland, a corporation of Switzerland Application June 8, 1949, Serial No. 97,888
In Switzerland June 21, 1948

2 Claims. (Cl. 60—59)

1

The invention relates to regulation of the working-medium temperatures in a heater comprising two heating systems for thermal power plants in which a gaseous working medium is compressed in at least one compressor and is thereafter heated to a predetermined temperature in a high-pressure heating system, whereafter it is partially expanded in at least one power engine, while giving up energy, and is then again heated in a low-pressure heating system to a predetermined temperature and subsequently further expanded in at least a second power engine.

In such thermal power plants, it is important, in order to reach the degree of efficiency on which their design is based and also for reasons connected with the output equilibrium of the groups of engines, that the temperatures of the parts of the working medium which leave the two heating systems should as far as possible constantly have the values on which the design is based. The problem consequently arises of maintaining the temperature simultaneously at the required level at the point of discharge from each of the two heating systems even when the normal heat exchange at the two systems is disturbed by external influences, for example soiling of the heating surfaces. In solving this problem, it is also necessary to meet the requirement that an increase in the temperature of the heating system above the values fixed in the design thereof should be avoided for reasons of operational safety.

In installations of the type referred to in the opening paragraph, it is an obvious step, in the event of the soiling of one of the heating systems, to obtain the required working-medium temperature at the point of discharge from the heating system in question by admixing part of the working medium from the higher pressure heating system with the working medium which flows through the low-pressure system and by increasing the temperatures, thus brought to the required ratio, to the predetermined values by regulating the supply of fuel. However, such a procedure is not practicable owing to the thermodynamic losses which it causes.

The necessary simultaneous regulation of the temperatures at which the working media leave the two heating systems could in theory also be effected by varying the effective heating surfaces, for example by screening a part of the heating tubes, or by means of by-passes or other means (for example dampers) for guiding the heating gases around the heating systems, or by varying the heat transfer by means of a variation of the excess of air or of a quantity of circulating gas.

2

The first-mentioned regulating scheme entails the provision of complicated arrangements which are too unreliable in operation at the high temperatures required and cause excessive losses, while variations in the air excess and in the quantity of circulating gas are generally insufficient and too slow in effect and entail thermodynamic losses.

The object of the invention is to provide means by which it is possible to solve the aforesaid problem of simultaneously regulating the temperatures of two currents of working medium which must each be brought to a predetermined temperature in two separate heating systems located in the same heater and therefore heated by the same flue gases, without undue thermodynamic losses, at any time and in a simple and reliable manner (also in regard to over-heating). According to the invention, this is achieved owing to the fact that each heating system can be by-passed by part of the medium normally flowing thereto in order to be heated therein, and the two component currents (i. e. the current flowing through the heater and that flowing through the by-pass) are mixed again before entering the power engine associated with the heating system in question, the temperatures of the working media at the point of admission to the two power engines being brought to the required ratio with respect to one another upon variation of the quantities of working medium flowing through the by-passes. Flow through the by-passes can be controlled in any suitable way for example manually.

An embodiment of the subject of the invention is illustrated by way of example and in simplified form in the accompanying drawing, the figure showing a thermal power plant in which air, as a working medium, described a closed circuit.

In the figure, 1 is a compressor of the turbine type to which air cooled in a pre-cooler 2 flows through a pipe 3. The working medium compressed in the said compressor 1 passes through a pipe 4 into a heat exchanger 5, in which it absorbs heat, and then flows through a pipe 6 into the high-pressure heating system 7 of a heater 8, in which heat is supplied to the air from a source external to the circuit. The working medium thus brought to higher temperature flows through a pipe 9 to a high-pressure turbine 10, in which it is expanded while giving up energy to the compressor 1. The same engine group comprises a motor 11 serving to start the plant. The working medium thus expanded then passes through a pipe 12 into a low-pressure heating system 13, which is also arranged in the heater 8 and in which heat is supplied to the air for the second time from the same external source. The working medium thus heated for the second time flows through a pipe 14 to a low-pressure turbine 15, in which it is further expanded, and passes then through a pipe 16 into the heat exchanger 5. The expanded hot part of the circulating air gives up heat in the heat exchanger 5 to the relatively cold part of the circulating air coming from the compressor 1, whereupon the first-mentioned part of the said air passes through a pipe 17 into the pre-cooler 2 and out of the said pre-cooler into the suction pipe 3 of the compressor 1. This completes the circuit of the plant. The low-pressure turbine 15 drives a consumer of useful energy, which is constructed in the illustrated example as a generator 18. The motor 18' is connected and is used for starting the plant.

19 is a by-pass pipe connected to the pipes 6 and 9 and in which a flow-regulating valve 20 is provided. Further, 21 is a second by-pass pipe which is connected to the pipes 12 and 14 and in which a flow-regulating valve 22 is provided. Finally, 23 is a burner for the heater 8, to which is fed fuel through a pipe 24, primary air through a pipe 25 and secondary air through a pipe 26.

In the described embodiment, the high-pressure heating system 7 can therefore be by-passed by part of the cold medium flowing thereto through the pipe 6, after the valve 20 has been opened, the portion of cold air flowing through the by-pass 19 being mixed before reaching the power engine 10 associated with this heating system 7, with the heated part which has passed into the pipe 9. Similarly, the low-pressure heating system 13 can be by-passed by part of the colder medium flowing thereto through the pipe 12, by means of the pipe 21 after the valve 22 has been opened. The medium flowing through the said pipe 21 and therefore not heated for the second time is mixed, before reaching the turbine 15 associated with the low-pressure heating system 13, with the air which is heated for the second time and which flows from the low-pressure heating system 13 into the pipe 14.

The working medium temperatures at the point of entry into the two power engines 10 and 15 can be brought into the required ratio in relation to one another with the aid of the by-pass pipes 19 and 21. It is consequently possible in a simple manner to maintain the working-medium temperatures at the point of admission to the power engines 10 and 15 individually and substantially constantly at the values at which they must remain in order that these power engines may operate continuously with optimum efficiency. The tubes of the heater are very highly stressed even during normal operation, so that any over-stressing by temperature increases should as far as possible be avoided. Safety of operation, in particular protection against over heating, is achieved and further increased by the invention owing to the fact that the valves 20, 22 are normally always somewhat open and prevented from opening further. The said valves may be closed for the purpose of regulation or in the event of danger of over heating of the tubes of the heating system. In such an event, more working medium flows through the heating systems, so that the temperature of the working medium at the point at which it leaves the said systems is lowered.

Both the compressor by which the working medium is compressed and the high-pressure turbine and low-pressure turbine may if necessary be constructed as engines comprising a plurality of housings, so that the working medium heated in the high-pressure heating system by an external heat supply can be expanded in two or more power engines and the working medium heated for the second time in the low-pressure heating system can also be expanded in two or more power engines and that part of the working medium which is to be compressed, can be compressed in two or more compressors.

What is claimed is:

1. A thermal power plant comprising a closed circuit in which a gaseous working medium flows, said circuit including two heating systems for the working medium; a combustion source of heat external to said systems, and common to the two, by means of which heat is supplied to working medium flowing through each of the two heating systems; a high pressure turbine through which the working medium heated in the first of said heating systems is caused to expand, the medium so-expanded flowing into the second of said heating systems; a low pressure turbine devoid of mechanical connection with the high pressure turbine and through which the working medium heated in said second heating system is caused to expand; a cooler in which heat is withdrawn from the so-expanded working medium; a compressor driven by one of said turbines and connected to receive working medium exhausted by the low pressure turbine and cooled in said cooler and deliver it at increased pressure to the first of said heating systems; a consumer of useful energy driven by the other one of said turbines; a by-pass connecting the admission end of the first heating system with the admission to the high pressure turbine; a flow-regulating valve interposed in said by-pass; a second by-pass connecting the admission end of said second heating system with the admission end of the low pressure turbine; and a flow-regulating valve inserted in said second by-pass.

2. The combination defined in claim 1 in which the turbine which drives the compressor is the high pressure turbine and the turbine which drives the consumer of useful energy is the low pressure turbine, the two turbines thereby operating at speeds independent from one another.

CURT KELLER.

References Cited in the file of this patent

UNITED STATES PATENTS

| Number | Name | Date |
| --- | --- | --- |
| 1,270,877 | Schulz | July 2, 1918 |
| 2,174,663 | Keller | Oct. 3, 1939 |
| 2,330,298 | McCollum | Sept. 28, 1943 |
| 2,392,622 | Traupel | Jan. 8, 1946 |
| 2,394,253 | Nettel et al. | Feb. 5, 1946 |
| 2,419,463 | Ruegg | Apr. 22, 1947 |
| 2,421,387 | Lysholm | June 3, 1947 |
| 2,478,504 | Ruegg | Aug. 9, 1949 |

FOREIGN PATENTS

| Number | Country | Date |
| --- | --- | --- |
| 468,287 | Great Britain | July 1, 1937 |